(12) United States Patent
Heifets et al.

(10) Patent No.: US 8,921,756 B2
(45) Date of Patent: Dec. 30, 2014

(54) PHOTO-DETECTOR DEVICE AND A METHOD FOR BIASING A PHOTOMULTIPLIER TUBE HAVING A CURRENT SOURCE FOR SETTING A SEQUENCE OF VOLTAGE FOLLOWER ELEMENTS

(75) Inventors: Michael Heifets, Rehovot (IL); Pavel Margulis, Ashdod (IL)

(73) Assignee: Applied Materials Israel, Ltd., Rehovot (IL)

( * ) Notice: Subject to any disclaimer, the term of this patent is extended or adjusted under 35 U.S.C. 154(b) by 245 days.

(21) Appl. No.: 13/440,843

(22) Filed: Apr. 5, 2012

(65) Prior Publication Data

US 2013/0264464 A1 Oct. 10, 2013

(51) Int. Cl.
*H01J 40/14* (2006.01)
*H01J 31/50* (2006.01)
*H01J 43/30* (2006.01)

(52) U.S. Cl.
USPC .................................. 250/214 VT; 250/207

(58) Field of Classification Search
CPC .............. G01T 1/208; G01J 1/44; G01J 1/46; G02B 23/12; H01J 1/32; H01J 2201/32; H01J 1/34

USPC ......... 250/207, 214 VT; 313/103 R, 103 CM, 313/105 CM, 532, 533

See application file for complete search history.

(56) References Cited

U.S. PATENT DOCUMENTS

| 4,804,891 | A | * | 2/1989 | Sweeney | 315/383 |
| 5,525,794 | A | * | 6/1996 | Gibbons | 250/207 |
| 7,005,625 | B1 | * | 2/2006 | Mitchell | 250/207 |

* cited by examiner

*Primary Examiner* — Georgia Y Epps
*Assistant Examiner* — Carolynn A Moore
(74) *Attorney, Agent, or Firm* — Kilpatrick Townsend & Stockton LLP

(57) ABSTRACT

A photo-detector and method for operating same: the photo-detector comprises a photomultiplier tube comprising a plurality of electrodes, each having a photocathode, an anode, a first dynode, intermediate dynodes and a last dynode; and a biasing circuit that comprises a sequence of voltage follower elements, a voltage divider and a current source. The voltage divider is coupled across a high voltage power supply and different dynodes are coupled to different ones of the voltage follower elements, control inputs of which are coupled to different junctions of the voltage divider. The current source is coupled to the voltage divider, to the sequence of the voltage follower elements and to the cathode. The anode is coupled to a load element coupled to a positive pole of the high voltage power supply and arranged to receive an output signal of the anode and convert it to an output signal of the photo-detector.

15 Claims, 7 Drawing Sheets

Converting light impinging on a cathode of a photomultiplier tube of photo-detector device to an output signal of the photo-detector device. 910

Maintaining, by a biasing circuit of the photo-detector device, a voltage of each dynode of a plurality of dynodes of the photomultiplier tube, substantially constant regardless of changes in current drained by the dynode; wherein the plurality of dynodes comprise intermediate dynodes and a last dynode; wherein the photomultiplier tube further comprises an anode; wherein the biasing circuit comprises a sequence of voltage follower elements, a voltage divider and a current source; wherein the voltage divider is coupled to a high voltage power supply; wherein different dynodes of the intermediate dynodes and the last dynode are coupled to different voltage follower elements of the sequence of voltage follower elements; wherein control inputs of different voltage follower elements are coupled to different junctions of the voltage divider; wherein the current source is coupled to the voltage divider, to the sequence of the voltage follower elements and to the cathode; and wherein the anode is coupled to a load element arranged to receive an output signal of the anode and convert it to an output signal of the photo-detector device. 920

PHOTO-DETECTOR DEVICE AND A METHOD FOR BIASING A PHOTOMULTIPLIER TUBE HAVING A CURRENT SOURCE FOR SETTING A SEQUENCE OF VOLTAGE FOLLOWER ELEMENTS

FIELD OF THE INVENTION

Photo-detector devices built with photomultiplier tubes and biasing circuits.

BACKGROUND OF THE INVENTION

Photomultiplier tubes are used to detect photons and exhibit a very high gain factor. Typical gain factors of photomultiplier tubes may exceed 1,000,000. A photomultiplier tube includes a photocathode that receives photons and in response emits electrons, multiple dynodes, each dynode is arranged to receive electrons from a previous dynode and emit more electrons that it received, and an anode arranged to receive the electrons emitted from a last dynode and to output an electrical detection signal.

Typically, photo-detector devices built with photomultiplier tubes have a biasing circuit that provides biasing voltages to the photocathode, the anode and the dynodes by a chain of resistors connected in series. Capacitors may be connected in parallel to the resistors to improve output linearity at short light pulses.

When working at high gains the current drained by each dynode (equivalent to the difference between the electrons received by a dynode and the electrons emitted by the dynode) dramatically changes between the dynodes. Thus, "low current" dynodes—dynodes that follow the photocathode drain currents that are smaller (by few order of magnitudes) than the current drained by "high current" dynodes—dynodes that precede the anode.

U.S. Pat. No. 7,005,625 of Mitchell, titled "Low power stabilized voltage divider network" makes a clear distinction between (a) the photocathode and "low current" dynodes that follow the photocathode and (b) anode and "high current" dynodes that precede the anode. The former are biased by resistors while the latter are biases by transistors. This patent is incorporated herein by reference.

There is a growing need to provide an efficient photo detector built with a photomultiplier tube that will be able to operate at wide gain range and wide incident light intensity range.

SUMMARY

According to an embodiment of the invention there is provided a photo-detector device comprising: a photomultiplier tube comprising a plurality of electrodes, the plurality of electrodes comprises a photocathode, an anode, a first dynode, intermediate dynodes and a last dynode; and a biasing circuit that comprises a sequence of voltage follower elements, a voltage divider and a current source; wherein the voltage divider is coupled across a high voltage power supply; wherein different dynodes are coupled to different voltage follower elements of the sequence of voltage follower elements; wherein control inputs of different voltage follower elements are coupled to different junctions of the voltage divider; wherein the current source is coupled to the voltage divider, to the sequence of the voltage follower elements, to the cathode and to a negative pole of the high voltage power supply; and wherein the anode is coupled to a load element coupled to a positive pole of the high voltage power supply and arranged to receive an output signal of the anode and convert it to an output signal of the photo-detector device.

According to one embodiment of the invention, the current source is coupled between the first dynode and the cathode. According to another embodiment of the invention, a voltage follower element of the sequence of voltage follower elements is coupled between the cathode and the first dynode, and the current source is coupled between the negative pole of a high voltage power supply and the cathode.

According to embodiments of the invention, the voltage follower element comprises a transistor, or a transistor and a Zener diode.

According to an embodiment of the invention, the biasing circuit further comprises a first sequence of capacitors that are each coupled in parallel to a resistor of a sequence of resistors of the voltage divider. According to another embodiment of the invention, the biasing circuit further comprises a first capacitor coupled in parallel to the voltage divider. According to another embodiment of the invention, the photo-detector device further comprises a second sequence of capacitors, wherein each capacitor of the second sequence of capacitors is coupled between a pair of dynodes. According to an embodiment of the invention, the current source is arranged to supply a constant current to the voltage divider and wherein the voltage follower elements are arranged to output a substantially constant voltage regardless of changes in current drained by the dynodes. According to an embodiment of the invention, the photo-detector device is arranged to operate with a gain that does not exceed 10,000. According to another embodiment of the invention, the photo-detector device is arranged to operate with a gain that exceeds 1,000,000

According to an embodiment of the invention there is provided a method of operating a photo-detector device, the method comprises: converting light impinging on a cathode of a photomultiplier tube of photo-detector device to an output signal of the photo-detector device; and maintaining, by a biasing circuit of the photo-detector device, a voltage of each dynode of a plurality of dynodes of the photomultiplier tube, substantially constant regardless of changes in current drained by the dynode; wherein the plurality of dynodes comprise a first dynode, intermediate dynodes and a last dynode; wherein the photomultiplier tube further comprises an anode and a cathode; wherein the biasing circuit comprises a sequence of voltage follower elements, a voltage divider and a current source; wherein the voltage divider is coupled across a high voltage power supply; wherein different dynodes are coupled to different voltage follower elements of the sequence of voltage follower elements; wherein control inputs of different voltage follower elements are coupled to different junctions of the voltage divider; wherein the current source is coupled to the voltage divider, to the sequence of the voltage follower elements, negative pole of the high voltage supply and to the cathode; and wherein the anode is coupled to a load element coupled to the positive pole of the high voltage supply and arranged to receive an output signal of the anode and convert it to an output signal of the photo-detector device. According to an embodiment of the invention, the method for operating the photo-detector device comprises operating the photo-detector device with a gain that does not exceed 10,000.

BRIEF DESCRIPTION OF THE DRAWINGS

Further details, aspects and embodiments of the invention will be described, by way of example only, with reference to the drawings. In the drawings, like reference numbers are

FIG. 7 illustrate a method according to an embodiment of the invention.

DETAILED DESCRIPTION OF THE DRAWINGS

Figure 1:
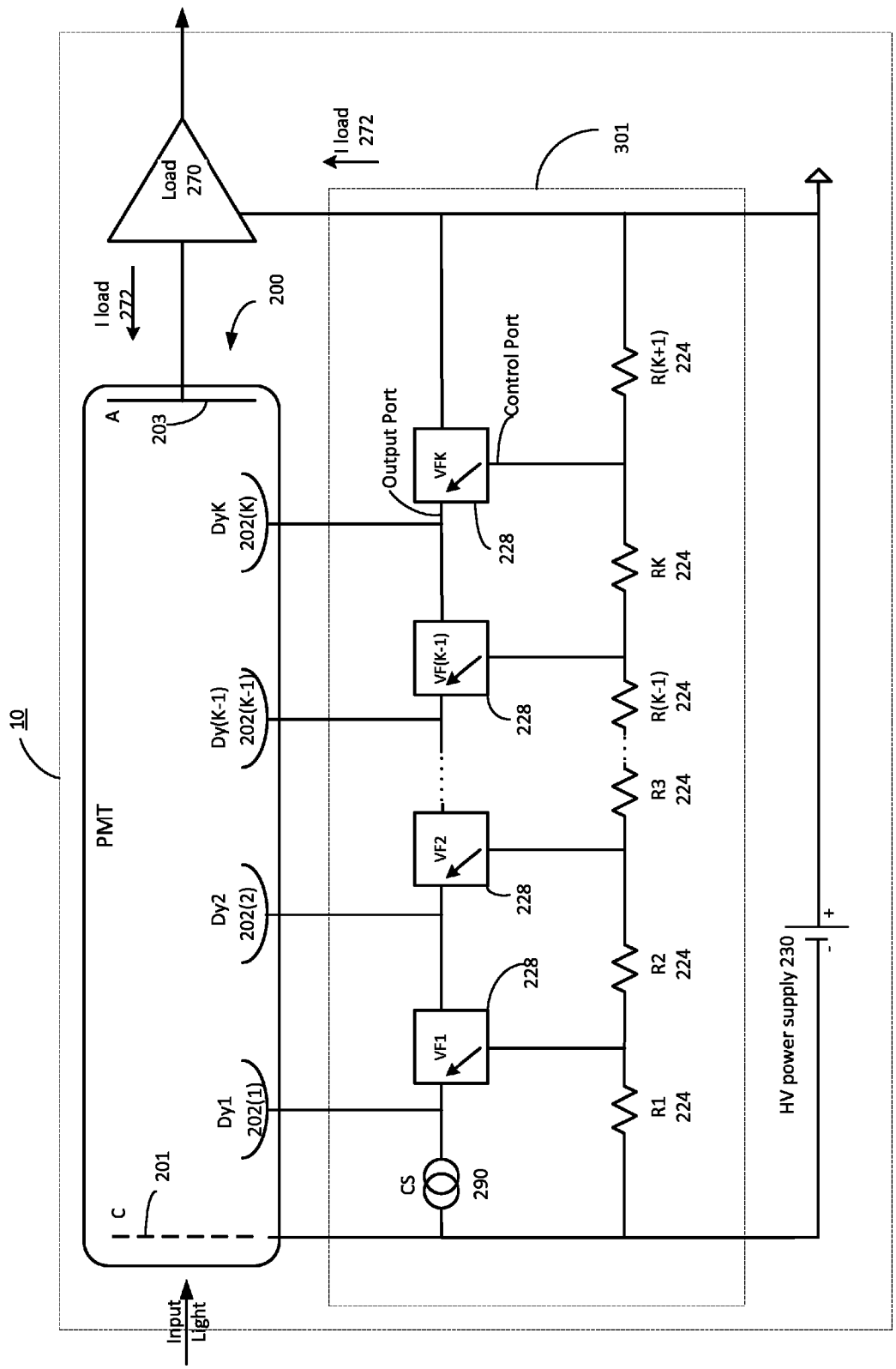
FIG. 1 illustrates a photo-detector device according to an embodiment of the invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

There is provided a biasing circuit that is arranged to power a photomultiplier tube (PMT), used in precision photo detectors with wide range of input light intensities and gain.

According to embodiments of the invention, the biasing circuit may comply with at least one of the following design basic criteria:

Maintaining constant electrode voltages over a wide range of incident light intensities, or correspondingly, over a wide range of the PMT electrode currents;

Minimizing voltage transients at the output of a high voltage (HV) power supply commonly happening at fast load variation, or correspondingly, minimizing the high voltage power supply current variations;

Maintaining above properties in wide PMT gain range;

Limiting a maximum current, flowing through PMT at the lowest possible level, in order to increase a PMT lifetime; The PMT current limit value should not depend on the PMT gain, i.e. on applied high voltage.

Minimizing current drawn from the High voltage supply source.

According to embodiments of the invention, the PMT can operate at low gain —contrary to the typical use of PMTs.

When operating the PMT at a low gain there is a need to take into account the current that is drained by each of the dynodes. The currents that flow through the photocathode and dynodes following the photocathode are not negligible in relation to the currents that flow through the anode and the dynodes that precede it.

For low gain applications, using resistors to bias some of the dynodes while using transistors to bias other dynodes may result in unacceptable changes in the gain resulting from changes in the electrodes voltages resulting from changes in the current drained by the electrodes of the PMT that in turn result from changes in the amount and/or energy of photons impinging on the photocathode.

These unwanted gain changes may be avoided by biasing all the dynodes of the PMT by voltage follower elements that are active elements. A voltage follower element may include a transistor.

Using active elements such as voltage follower elements for biasing all the dynodes may increase the cost of the biasing circuit and can even shorten the lifespan of the biasing circuit—in comparison to the lifespan that can be obtained when using only passive components, but allows to maintain the linearity of the gain (constant gain regardless of the current induced by the dynodes) even when operating the PMT at a low gain and high current mode.

Inspection systems can include multiple photomultiplier tubes that are equal to each other by structure but are operated at different gain modes. Using the same photomultiplier tubes eases the maintenance of the inspection tools and simplifies the design of such inspection tools. Photomultiplier tubes that are expected to detect bright field (reflected) light can operate at low gain while photomultiplier tubes that are expected to detect dark field or gray field (scattered and not reflected) light can operate at high gain.

It is also noted that the inspection system can include photomultiplier tubes that operate at different gains (or have the same photomultiplier tube operate at different gains at different points in time)—thereby increasing the dynamic range of detection.

The suggested photo-detector device provides linear anode current full scale up to the limit set by the current source and almost not dependent on the value of high voltage supplied by the high voltage supply unit.

The power requirements of the photo-detector device are minimal in comparison with most known topologies, allowing decreasing power dissipation and photo-detector device tube heating.

The photo-detector device provides an inherent feature of limiting the anode current in case of photomultiplier tube overload. The anode current is limited by the current supplied by the Current Source.

The photo-detector device provides a constant load current, set by the current source, to the high voltage supply source.

FIG. 1 illustrates a photo-detector device 10 according to an embodiment of the invention.

Photo-detector device 10 includes a photomultiplier tube 200 that includes a plurality of electrodes such as photocathode C 201, an anode A 203, a first dynode $D1y$ 202(1), intermediate dynodes 202(2)-202(K−1) and a last dynode 202(k).

Photo-detector device 10 also includes a biasing circuit 301 that includes a sequence of voltage follower elements VF1-VFK 228, a voltage divider that includes resistors R1-R(K+1) 224 and a current source 290.

A voltage follower element 228 can have a control input, an output and an additional input. The voltage provided by a voltage follower element follows that voltage provided to the control input of the voltage follower element.

Figure 3:
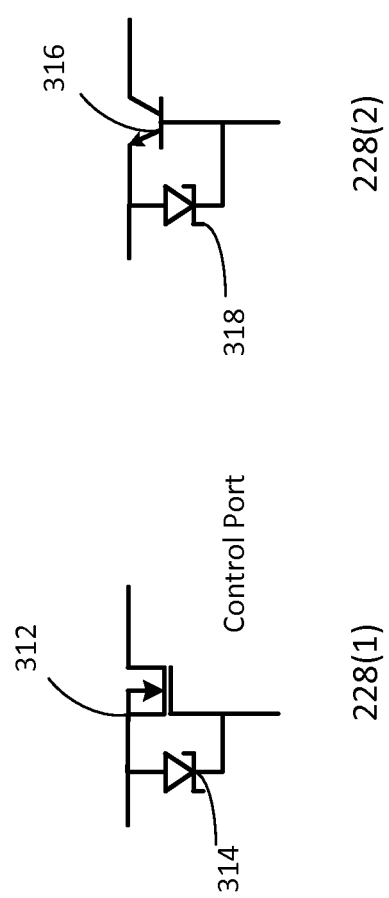
FIGS. 3 and 4 illustrates elements of the photo-detector devices according to embodiments of the invention.

The voltage follower element 228 is an active element and may include a transistor or a combination of a transistor and a diode. FIG. 3 illustrates two non-limiting examples of voltage follower elements 228(1) and 228(2) according to an embodiment of the invention. Voltage follower element 228(1) includes a MOSFET transistor 312 and a Zener diode 314 that is coupled between the gate of the MOSFET transistor 312 and the source of the MOSFET transistor 312. The gate electrode operates as a control input of the voltage follower element 228(1). The source electrode operates as an output of the voltage follower 228(1).

Voltage follower element 228(2) includes a bipolar transistor 316 and a Zener diode 318 that is coupled between the base of the bipolar transistor 312 and an emitter of the bipolar transistor 316. The base operates as a control input of the voltage follower element 228(2), and the emitter operates as an output of the voltage follower element 228(2).

Referring back to FIG. 1—the voltage divider is connected in parallel to a high voltage power supply 230. The high voltage power supply 230 is illustrated in FIG. 1 as being included in the photo-detector device 10; it may not belong to the photo-detector device 10 but be only connected to it.

The output load 270 is illustrated as being included in the photo-detector device 10; it may not belong to the photo-detector device 10 but be only connected to it. Output load 270 is connected to the biasing circuit 301 and to the anode and is illustrated as receiving a load current 272 from the biasing circuit 301 and providing the load current 272 to anode 203. The load element 270 is arranged to receive an output signal of the anode and convert it to an output signal of the photo-detector device 10.

Different dynodes of the intermediate dynodes 202(2)-202(K−1) and the last dynode 202(K) are connected to different, corresponding voltage follower elements VF1-VFK of the sequence of voltage follower elements. Especially the output node of the j'th voltage follower element VFj, j ranging between 2 and K is connected to the j'th dynode 202(j).

Control inputs of different voltage follower elements V1-VFK are coupled to different, corresponding junctions of the voltage divider, these junctions are defined between consecutive resistors of R(K+1) till R2.

A first end of the current source 290 is connected to VF1 and first dynode 202(1) and a second end of current source 290 is connected to cathode 201, to a first end of R1 224 and to a negative pole of the high voltage power supply 230.

The positive pole of the high voltage power supply 230 is connected to a reference port of the load element 270 (to provide the load current 272), to R(K+1) of the voltage divider and to voltage follower element VFK.

FIG. 1 illustrates the positive pole of the high voltage power supply 230 as being grounded but it can be arranged to provide voltages that differ from ground level voltage.

The high voltage power supply 230 maintains a constant voltage across the voltage divider 224 so that a constant voltage is provided to the control inputs of the voltage follower elements 228 that are arranged to output a constant voltage to the plurality of dynodes—regardless of the current drained by these dynodes—that regardless the gain of the PMT substantially unchanged.

In photo-detector device 10 the current through voltage follower elements can be set by the current source 290 that provides a constant current. The current level may be set to a level exceeding maximum required anode current by 10-20%;

At full darkness the anode current and dynodes currents are negligible (dark currents). In this case all the current generated by the current source may flow through the voltage followers, from the positive pole to the negative pole of the high voltage power supply 230.

Figure 2:
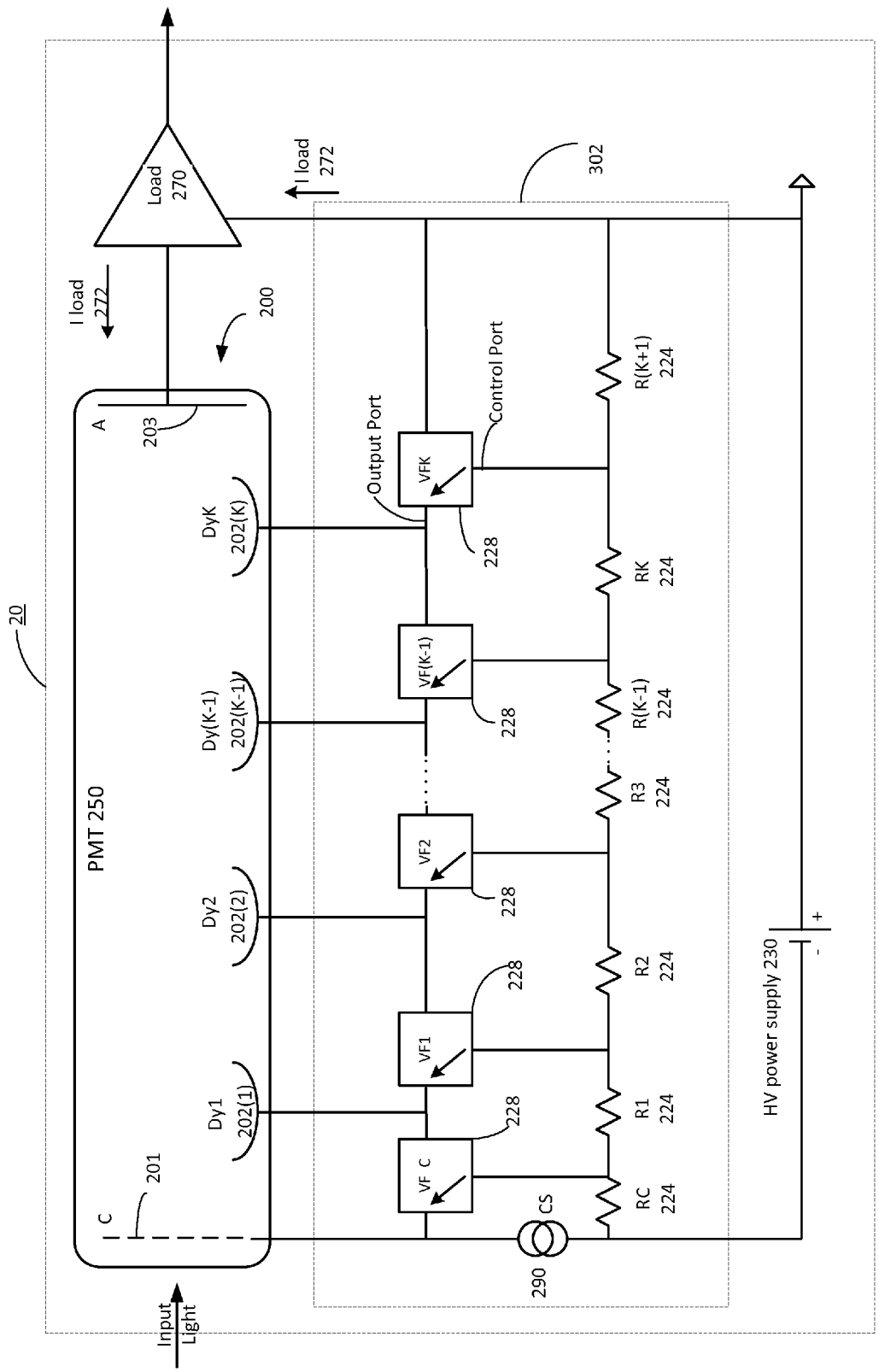
FIG. 2 illustrates a photo-detector device according to an embodiment of the invention.

FIG. 2 illustrates a photo-detector device 20 according to an embodiment of the invention.

Photo-detector device 20 has biasing circuit 302.

Photo-detector device 20 of FIG. 2 differs from photo-detector device 10 of FIG. 1 by (a) having an additional voltage follower VFC that is connected between the first dynode 202(1) and the cathode 201, (b) having the current source 290 that is connected between the negative pole of the high voltage power supply 230 and the cathode 201 instead of being connected between the first dynode and the cathode 201, and (c) having an additional resistor RC 224 connected between the current source and the first resistor R1 224 of the voltage divider.

In the embodiment illustrated in FIG. 2, the voltage at the cathode 201 is also maintained to be constant, independent of the cathode current. Further, the transients in the cathode current are not applied to the output of the high voltage power supply 230. The high voltage power supply 230 thus provides an output voltage with no transients. Thus, PMT gain modulation is substantially avoided.

Figure 4:
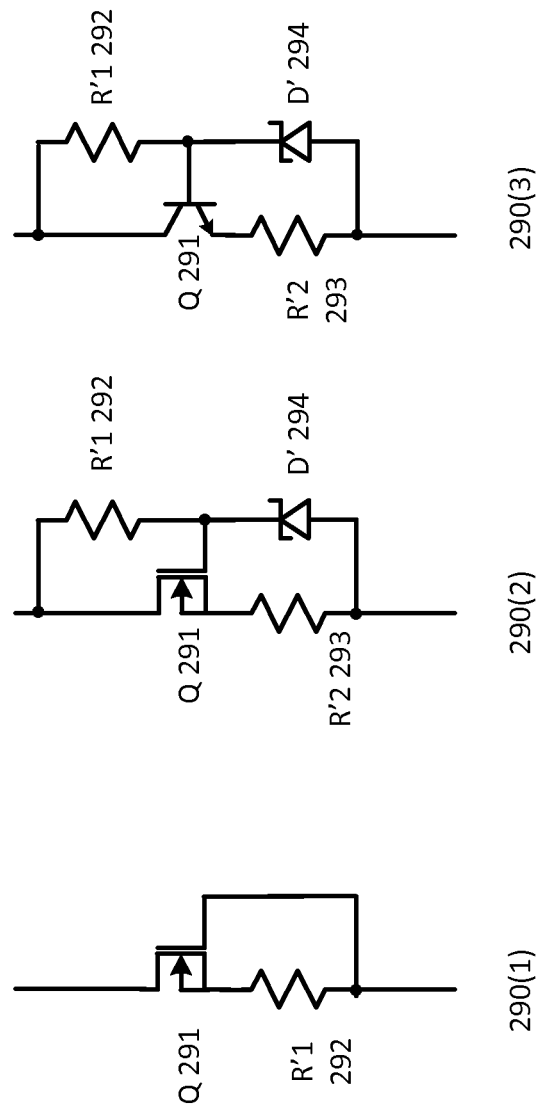

FIG. 4 illustrates current sources 290(1)-290(3) according to various embodiments of the invention.

Figure 5:
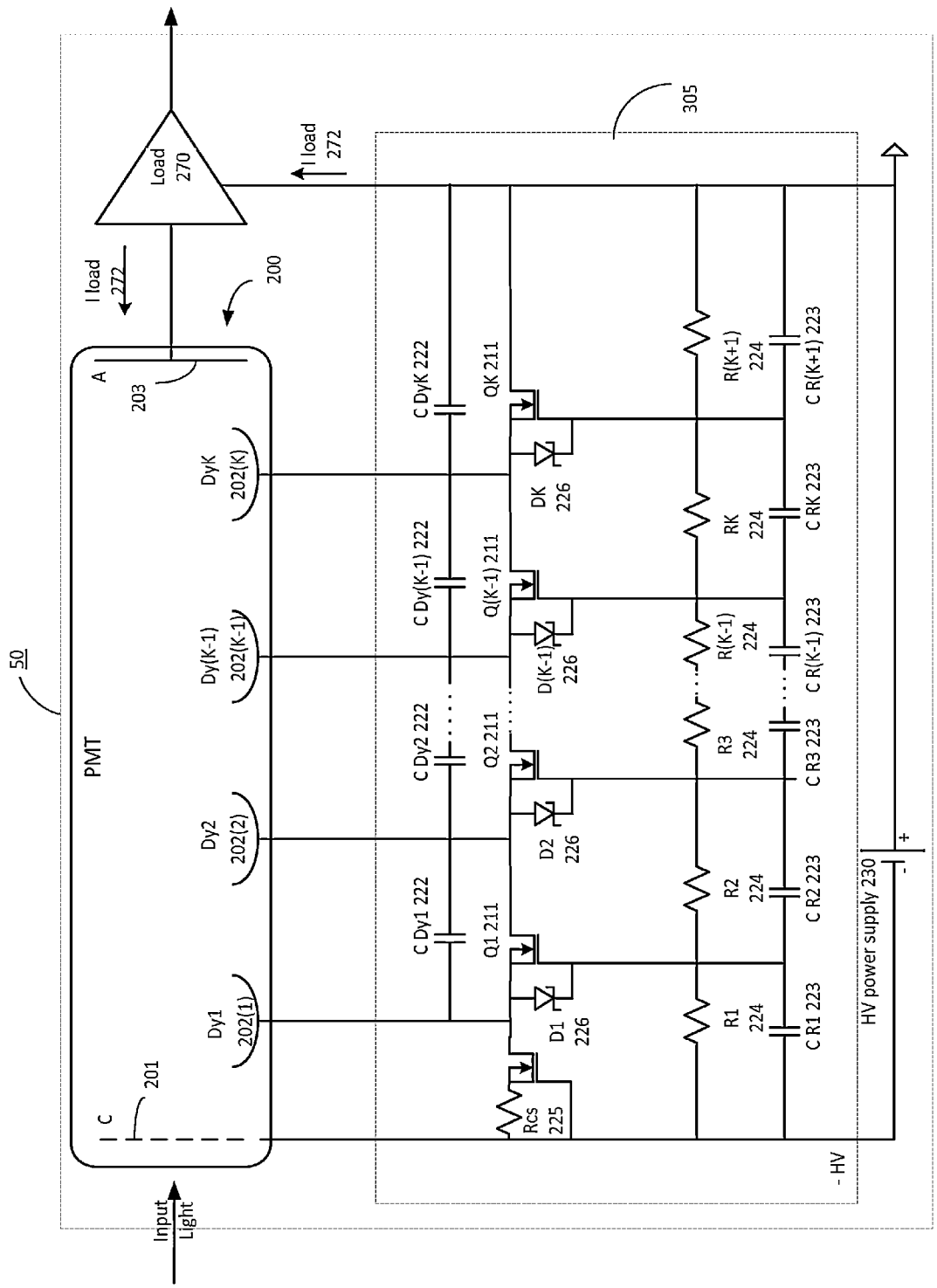
FIG. 5 illustrates a photo-detector device according to an embodiment of the invention.
Figure 6:
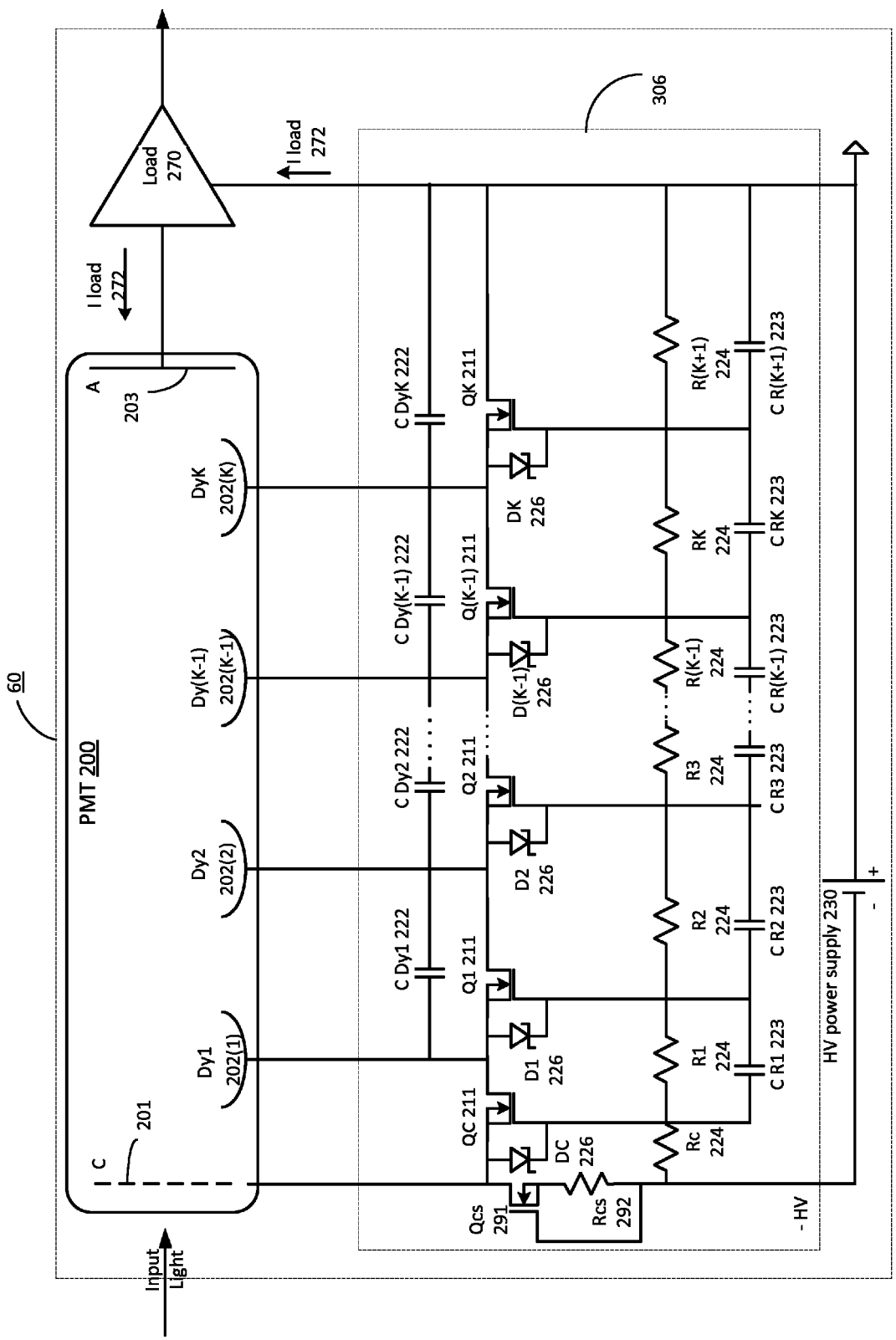
FIG. 6 illustrates a photo-detector device according to an embodiment of the invention.

These current sources can replace current source 290 of FIG. 1 or 2 or be used as current sources in FIGS. 5 and 6.

Current source 290(1) includes a depletion-mode MOSFET transistor 291 and a resistor R'1 292. The resistor R'1 292 is connected between the gate and the source of the depletion-mode MOSFET transistor 291.

Current source 290(2) includes an enhancement-mode MOSFET transistor 291, resistors R'1 292 and R'2 293 and a Zener diode D' 294. The resistor R'1 292 is connected between the gate and the drain of the enhancement-mode MOSFET transistor 291. The Zener diode 294 is connected between the gate of the enhancement-mode MOSFET transistor 291 and an output node of the current source 290(2). Resistor R'2 293 is connected between the source of the enhancement-mode MOSFET transistor 291 and the output node of the current source 290(2).

Current source 290(3) includes a bipolar transistor 291, resistors R'1 292 and R'2 293 and a Zener diode D' 294. The resistor R'1 292 is connected between the base and the collector of the bipolar transistor 291. The Zener diode 294 is connected between the base of the bipolar transistor 291 and an output node of the current source 290(2). Resistor R'2 293 is connected between the emitter of the bipolar transistor 291 and the output node of the current source 290(2).

FIG. 5 illustrates a photo-detector device 50 according to an embodiment of the invention.

Photo-detector device 50 has biasing circuit 305.

The photo-detector device 50 of FIG. 5 differs from the photo-detector device 10 of FIG. 1 by the following:

a. The voltage follower elements VF1-VFK 228 of FIG. 1 are illustrated (in FIG. 5) as including MOSFET transistors Q1-QK 211 and Zener diodes D1-DK 226. Each voltage follower element of FIG. 5 has the configuration of voltage follower element 228(1) of FIG. 3.

b. The current source 290 of FIG. 1 is illustrated as including depletion-mode MOSFET transistor QCS 210 and a resistor Rcs 225. The resistor Rcs 225 is connected between the gate and the source of the depletion-mode MOSFET transistor QCS 210.

c. Photo-detector device 50 includes a first sequence of capacitors that includes K+1 capacitors denoted CR1-CR(K+1). The first sequence is coupled in parallel to the voltage divider, wherein the j'th (j ranging between 1 and K+1) capacitor CR(j) is connected in parallel to the j'th resistor R(j) of the voltage divider. R(K+1) and CR(K+1) are connected between the gate electrode of QK and load 270.

d. Photo-detector device 50 includes a second sequence of capacitors that includes K+1 capacitors denoted Ccs and Cdy1-CdyK 222. Ccs 222 is connected between the cathode and the first dynode D1y, CdyK is connected between the load and the last dynode DyK, and each other capacitor of the second sequence is coupled between a pair of consecutive dynodes.

FIG. 6 illustrates a photo-detector device 60 according to an embodiment of the invention.

Photo-detector device 60 has biasing circuit 306.

The photo-detector device 60 of FIG. 6 differs from the photo-detector device 20 of FIG. 2 by the following:

a. The voltage follower elements VF1-VFK 228 and VFC of FIG. 2 are illustrated (in FIG. 6) as including MOSFET transistors Q1-QK and QC 211, Zener diodes D1-DK and DC 226. Each voltage follower element of FIG. 6 has the configuration of voltage follower element 228(1) of FIG. 3.

b. The current source 290 of FIG. 2 is illustrates illustrated as including depletion-mode MOSFET transistor Qcs 291 and a resistor Rcs 292. The resistor Rcs 292 is connected between the gate and the source of the depletion-mode MOSFET transistor Qcs 291.

c. Photo-detector device 60 includes a first sequence of capacitors that includes K+1 capacitors denoted CR1-CR(K+1). The first sequence is coupled in parallel to the voltage divider, wherein the j'th (j ranging between 1 and K+1) capacitor CR(j) is connected in parallel to the j'th resistor R(j) of the voltage divider. R(K+1) and CR(K+1) are connected between QK and load 270.

d. Photo-detector device 60 includes a second sequence of capacitors that includes K capacitors denoted Cdy1-CdyK 222. CdyK is connected between the load and the last dynode DyK, and each other capacitor of the second sequence is coupled between a pair of consecutive dynodes.

In the embodiments illustrated in FIGS. 5 and 6, the first sequence of capacitors 223 reduces the thermal noise generated by the resistors 224 of the voltage divider. This advantage can also be realized by coupling a capacitor across the voltage divider or part/s thereof. The second sequence of capacitors 222 contributes to maintain constant voltages on the dynodes 202, by compensating for finite response time of the voltage followers (elements 226 and 211) to fluctuations of current in corresponding dynodes.

It is noted that either one of the first sequence of capacitors and the second sequence of capacitors can be omitted from the photo-detector devices of FIGS. 5 and 6 and that either one of photo-detector devices 10 and 20 can include at least one of the first and second sequences of capacitors. In the embodiments illustrated in FIGS. 5 and 6, each of the first and second sequence of capacitors includes multiple capacitor elements. The number of capacitors depends on the number of voltage followers. The invention is not limited by the illustrated embodiments and the sequence of capacitors could be implemented by using less capacitors. This is illustrated in FIG. 6, wherein the second capacitor sequences misses one capacitor element compared to the one illustrated in FIG. 5.

The biasing circuits illustrated in FIGS. 5 and 6 are not limited to the specific embodiment 228(1) of voltage follower elements. Embodiment 228(2) illustrated in FIG. 3 could equally be used. Further, different voltage follower embodiments could be used together and there is no need that all voltage follower elements will have a common structure.

The biasing circuits illustrated in FIGS. 5 and 6 are not limited to the specific embodiment 228(1) of voltage follower elements. Embodiment 228(2) illustrated in FIG. 3 could equally be used. Further, different voltage follower embodiments could be used together and there is no need that all voltage follower elements will have a common structure.

FIG. 7 illustrates method 900 according to an embodiment of the invention.

Method 900 includes stages 910 and 920 that may be executed in parallel to each other.

Stage 910 may include converting light impinging on a cathode of a photomultiplier tube of photo-detector device to an output signal of the photo-detector device.

Stage 920 may include maintaining, by a biasing circuit of the photo-detector device, a voltage of each dynode of a plurality of dynodes of the photomultiplier tube, substantially constant regardless of changes in current drained by the dynodes; wherein the plurality of dynodes comprise a first dynode, intermediate dynodes and a last dynode; wherein the photomultiplier tube further comprises an anode and a cathode; wherein the biasing circuit comprises a sequence of voltage follower elements, a voltage divider and a current source; wherein the voltage divider is coupled to a high voltage power supply; wherein different dynodes of the intermediate dynodes and the last dynode are coupled to different voltage follower elements of the sequence of voltage follower elements; wherein control inputs of different voltage follower elements are coupled to different junctions of the voltage divider; wherein the current source is coupled to the voltage divider, to the sequence of the voltage follower elements and to the cathode; and wherein the anode is coupled to a load element arranged to receive an output signal of the anode and convert it to an output signal of the photo-detector device.

Method 900 can be executed by any of photo-detector devices 10, 20, 50 and 60.

Stage 910 can be executed while operating the photo-detector device with a gain that may be low (for example- may be below 10,000), very low, medium, high (for example may exceed one million) or very high.

According to an embodiment of the invention, there is provided a method of maintaining constant voltages at photomultiplier tube electrodes, comprising supplying all dynodes voltages through corresponding voltage follower elements connected in series; and supplying a constant current to all of the voltage follower elements connected in series from a common current source. Each of the voltage followers could be supplied through a corresponding resistive voltage divider, wherein all resistive voltage dividers are connected in series. According to one embodiment of the invention, the method further comprises supplying the cathode voltage through an additional voltage follower, wherein said current source is connected between the negative pole of the high voltage power supply and the cathode. According to another embodiment of the invention, the method further comprises connecting the cathode to the negative pole of the high voltage power supply and connecting said current source between the negative pole of the high voltage power supply and the a first dynode from among said multiple dynodes. According to other embodiments of the invention, one or more of the following steps could be implemented: providing capacitors between one or more adjacent dynodes; providing a capacitor between the cathode and an adjacent dynode; providing a capacitor between the positive pole of high voltage power supply and the adjacent dynode; connecting multiple capacitors in parallel to part or all of the multiple resistive elements, or any combination thereof.

For ease of explanation, various embodiments of the invention were illustrated with a number K of dynodes. It should be understood that the number of dynodes could vary in accordance with the requirements of specific applications. Typically, commercially available PMTs includes 6 to 14 dynodes, but this should not limit the invention. The invention could be implemented using PMTs with any number of dynodes, starting from 1.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A photo-detector device comprising:
 a photomultiplier tube comprising a plurality of electrodes, the plurality of electrodes comprises a photocathode, an anode, a first dynode, intermediate dynodes and a last dynode; and
 a biasing circuit that comprises a sequence of voltage follower elements, a voltage divider and a current source;
 wherein the voltage divider is coupled across a high voltage power supply;
 wherein different dynodes are coupled to different voltage follower elements of the sequence of voltage follower elements;
 wherein control inputs of different voltage follower elements are coupled to different junctions of the voltage divider;
 wherein the current source is coupled to the voltage divider, to the sequence of the voltage follower elements, to the cathode and to a negative pole of the high voltage power supply such that the current source sets the current in the sequence of voltage follower elements; and
 wherein the anode is coupled to a load element coupled to a positive pole of the high voltage power supply and arranged to receive an output signal of the anode and convert it to an output signal of the photo-detector device.

2. The photo-detector device according to claim 1, wherein the current source is coupled between the first dynode and the cathode.

3. The photo-detector device according to claim 1, wherein a voltage follower element of the sequence of voltage follower elements is coupled between the cathode and the first dynode, and the current source is coupled between the negative pole of a high voltage power supply and the cathode.

4. The photo-detector device according to claim 1, wherein the voltage follower element comprises a transistor.

5. The photo-detector device according to claim 1, wherein the voltage follower element comprises a transistor and a Zener diode.

6. The photo-detector device according to claim 1, wherein the biasing circuit further comprises a first sequence of capacitors that are each coupled in parallel to a resistor of a sequence of resistors of the voltage divider.

7. The photo-detector device according to claim 6, comprising a second sequence of capacitors, wherein each capacitor of the second sequence of capacitors is coupled between a pair of dynodes.

8. The photo-detector device according to claim 1, wherein the biasing circuit further comprises a first capacitor coupled in parallel to the voltage divider.

9. The photo-detector device according to claim 1, comprising a sequence of capacitors, wherein each capacitor of the sequence of capacitors is coupled between a pair of dynodes.

10. The photo-detector device according to claim 1, wherein the current source is arranged to supply a constant current to the voltage divider and wherein the voltage follower elements are arranged to output a substantially constant voltage regardless of changes in current drained by the dynodes.

11. The photo-detector device according to claim 1, arranged to operate with a gain that does not exceed 10,000.

12. A method of operating a photo-detector device, the method comprises:
 converting light impinging on a cathode of a photomultiplier tube of photo-detector device to an output signal of the photo-detector device; and
 maintaining, by a biasing circuit of the photo-detector device, a voltage of each dynode of a plurality of dynodes of the photomultiplier tube, substantially constant regardless of changes in current drained by the dynode;
 wherein the plurality of dynodes comprise a first dynode, intermediate dynodes and a last dynode;
 wherein the photomultiplier tube further comprises an anode and a cathode;
 wherein the biasing circuit comprises a sequence of voltage follower elements, a voltage divider and a current source;
 wherein the voltage divider is coupled across a high voltage power supply;
 wherein different dynodes are coupled to different voltage follower elements of the sequence of voltage follower elements;
 wherein control inputs of different voltage follower elements are coupled to different junctions of the voltage divider;
 wherein the current source is coupled to the voltage divider, to the sequence of the voltage follower elements, negative pole of the high voltage supply and to the cathode such that the current source sets the current in the sequence of voltage follower elements; and
 wherein the anode is coupled to a load element coupled to the positive pole of the high voltage supply and arranged to receive an output signal of the anode and convert it to an output signal of the photo-detector device.

13. The method according to claim 12, wherein the current source is coupled between the first dynode and the cathode.

14. The method according to claim 12, wherein a voltage follower element of the sequence of voltage follower elements is coupled between the cathode and the first dynode, and the current source is coupled between a negative pole of a high voltage power supply and the cathode.

15. The method according to claim 12, comprising operating the photo-detector device with a gain that does not exceed 10,000.

* * * * *